(No Model.)

R. L. RENZ.
SHEARING MACHINE.

No. 437,515. Patented Sept. 30, 1890.

WITNESSES:
F. W. McArdle
C. Sedgwick

INVENTOR:
R. L. Renz
BY
Munn & Co
ATTORNEYS

UNITED STATES PATENT OFFICE.

ROBERT L. RENZ, OF POPLAR CREEK AGENCY, MONTANA, ASSIGNOR OF ONE-HALF TO HENRY WEIDMAN, OF SAME PLACE.

SHEARING-MACHINE.

SPECIFICATION forming part of Letters Patent No. 437,515, dated September 30, 1890.

Application filed March 28, 1890. Serial No. 345,701. (No model.)

*To all whom it may concern:*

Be it known that I, ROBERT LOUIS RENZ, of Poplar Creek Agency, in the county of Dawson and State of Montana, have invented a new and Improved Shearing-Machine, of which the following is a specification, reference being had to the annexed drawings, forming a part thereof, in which—

Figure 1:
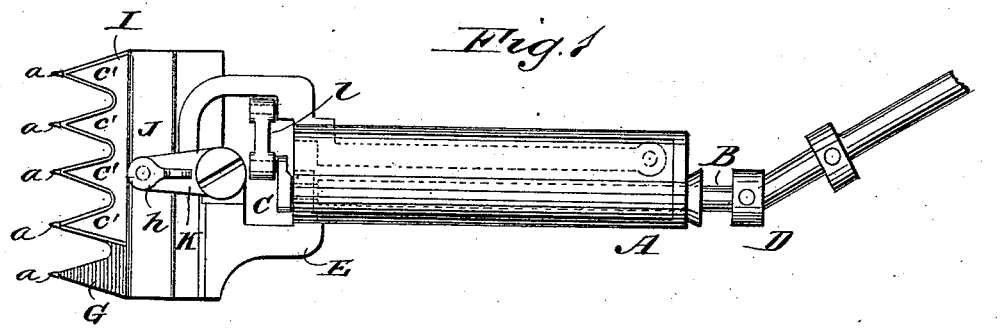
Figure 2:
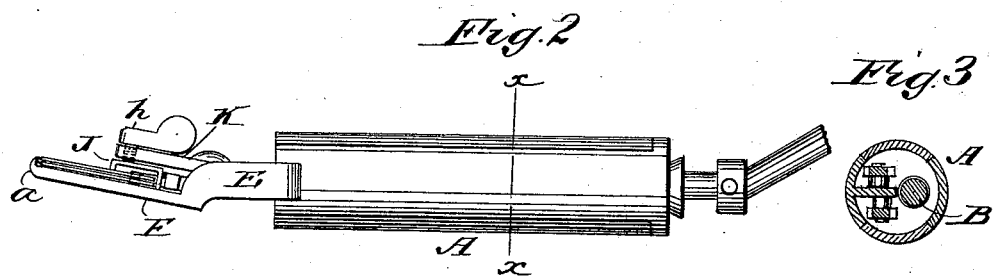
Figure 3:
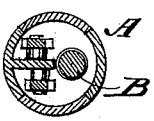
Figure 4:
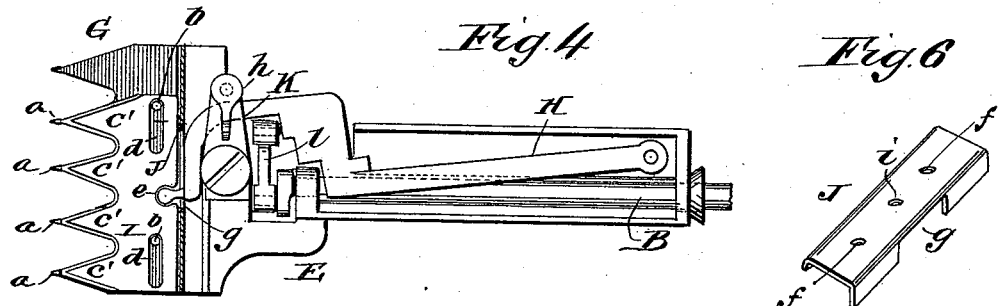
Figure 6:
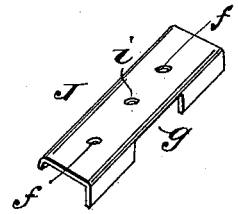
Figure 5:
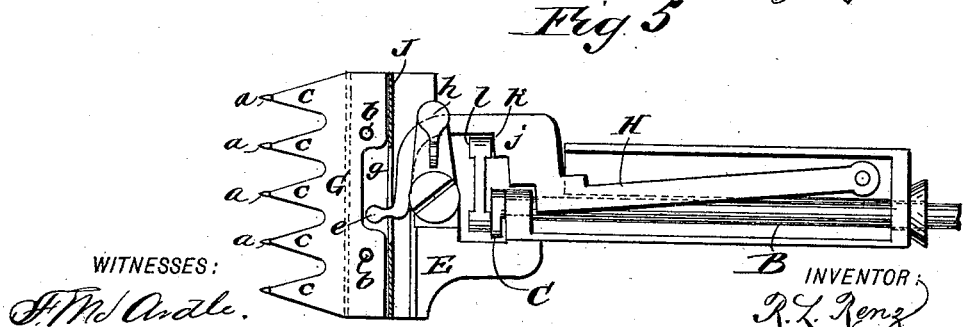

Figure 1 is a plan view of my improved shearing-machine. Fig. 2 is a side elevation. Fig. 3 is a transverse section taken on line $x$ $x$ in Fig. 2. Fig. 4 is a plan view with the casing removed. Fig. 5 is a plan view with the casing and movable knife removed, and Fig. 6 is a perspective view of the knife guide or holder.

Similar letters of reference indicate corresponding parts in all the views.

The object of my invention is to provide a simple and effective machine for shearing sheep, in which the knives may be readily removed and replaced for sharpening or for repairs.

My invention consists in the construction and combination of parts hereinafter described and claimed.

In the casing A, which forms the handle of the machine, is journaled a shaft B, which carries a crank C at one end and a coupling D at the opposite end. To the crank end of the casing A is attached a frame E, which is connected with the inclined plate F, terminating in guards $a$. The ends of the guards $a$ are turned upward and rounded, and the plate F is provided with two studs $b$, for receiving the stationary knife G, which is apertured to receive the studs $b$ and notched between the studs to allow the lever H to vibrate. The knife G is provided with a series of sharpened triangular teeth $c$, the ends of which are guarded by the rounded points $a$.

On the stationary knife G is placed the reciprocating knife I, which is provided with slots $d$, for receiving the studs $b$; also, with a notch $e$, for receiving the rounded end of the vibrating lever H. The knife I is provided with triangular teeth $c'$, corresponding to the teeth of the knife G. A guard-plate J, provided with downwardly-turned edges and with apertures $f$, is placed over the knife I, with one of its edges resting upon the knife, the other edge resting upon the plate F at the back of the knife, and with the studs $b$ received in the apertures $f$. The rear downwardly-turned edge is furnished with a notch $g$, which allows the lever H to vibrate. An arm K, pivoted to the plate F, is arranged to swing over the guard-plate J, and is provided with a screw $h$, which is adapted to enter the depression $i$ in the guard-plate J and clamp the said plate in the position of use.

The lever H is pivoted in the casing A and is bent outwardly to carry it around the crank C. The lever H is provided with a shoulder $k'$, from which projects a stud $k'$, for receiving one end of the connecting-rod $l$, the other end of which is placed on the crank C. When the shaft B is rotated, the lever H is vibrated and the knife I is reciprocated.

Having thus described my invention, I claim as new and desire to secure by Letters Patent—

1. The combination, with the frame, the fixed and movable cutters, and the guard-plate, of a horizontal swinging clamping-arm pivoted on the frame and swinging across the said guard-plate to hold it in position, substantially as set forth.

2. In a shearing-machine, the combination, with the movable knife I, of the swinging arm K, provided with the clamping-screw $h$ and the guard-plate J, substantially as specified.

ROBERT L. RENZ.

Witnesses:
DANIEL KNAPP,
HENRY WEIDMAN.